US007711742B2

United States Patent
Bennett et al.

(10) Patent No.: US 7,711,742 B2
(45) Date of Patent: May 4, 2010

(54) INTELLIGENT DATA QUERY BUILDER

(75) Inventors: Valerie M. Bennett, Macon, NC (US);
George L. Fridrich, Cary, NC (US);
Mohit Jain, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 400 days.

(21) Appl. No.: 10/734,043

(22) Filed: Dec. 11, 2003

(65) Prior Publication Data

US 2005/0131889 A1 Jun. 16, 2005

(51) Int. Cl.
*G06F 7/00* (2006.01)
*G06F 17/30* (2006.01)
(52) U.S. Cl. ................................ 707/759; 707/767
(58) Field of Classification Search ................ None
See application file for complete search history.

(56) References Cited

U.S. PATENT DOCUMENTS

| | | | | |
|---|---|---|---|---|
| 5,694,546 A | | 12/1997 | Reisman | |
| 5,844,554 A | * | 12/1998 | Geller et al. | 715/744 |
| 5,948,061 A | | 9/1999 | Merriman et al. | |
| 6,055,512 A | * | 4/2000 | Dean et al. | 705/17 |
| 6,094,681 A | | 7/2000 | Shaffer et al. | |
| 6,098,065 A | * | 8/2000 | Skillen et al. | 707/3 |
| 6,195,653 B1 | * | 2/2001 | Bleizeffer et al. | 707/2 |
| 6,208,975 B1 | | 3/2001 | Bull et al. | |
| 6,366,915 B1 | * | 4/2002 | Rubert et al. | 707/10 |
| 6,366,926 B1 | | 4/2002 | Pohlmann et al. | |
| 6,377,963 B1 | | 4/2002 | Walker et al. | |
| 6,405,034 B1 | | 6/2002 | Tijerino | |
| 6,484,200 B1 | | 11/2002 | Angal et al. | |
| 6,523,021 B1 | * | 2/2003 | Monberg et al. | 707/2 |
| 6,591,245 B1 | | 7/2003 | Klug | |
| 6,640,221 B1 | * | 10/2003 | Levine et al. | 707/3 |
| 6,701,311 B2 | * | 3/2004 | Biebesheimer et al. | 707/5 |
| 6,725,230 B2 | * | 4/2004 | Ruth et al. | 707/102 |
| 6,731,393 B1 | | 5/2004 | Currans et al. | |
| 6,751,611 B2 | * | 6/2004 | Krupin et al. | 707/3 |
| 6,985,899 B2 | * | 1/2006 | Chan et al. | 707/6 |
| 7,010,500 B2 | | 3/2006 | Aarnio | |
| 7,020,494 B2 | * | 3/2006 | Spriestersbach et al. | 455/566 |
| 7,069,254 B2 | * | 6/2006 | Foulger et al. | 706/14 |
| 7,113,921 B2 | | 9/2006 | Linker et al. | |
| 7,139,766 B2 | * | 11/2006 | Thomson et al. | 707/101 |
| 7,162,470 B2 | * | 1/2007 | Sharma et al. | 707/3 |
| 7,209,893 B2 | | 4/2007 | Nii | |
| 7,249,100 B2 | * | 7/2007 | Murto et al. | 705/50 |
| 7,370,040 B1 | * | 5/2008 | Kruy et al. | 707/4 |

(Continued)

OTHER PUBLICATIONS

Going Wireless, Enabling an Adaptive and Extensible Environment. Feb. 2003. Mobile Networks and Applications. Publisher: Springer Netherlands.*

*Primary Examiner*—Hosain T Alam
*Assistant Examiner*—Usmaan Saeed
(74) *Attorney, Agent, or Firm*—Marcia L. Doubet

(57) ABSTRACT

Techniques are disclosed for programmatically determining one or more logical choices to be offered to users as conditions of a data query (e.g., for searching a content source), and enabling extensions to already-established queries to be programmatically created. A number of different aspects are described, and include programmatically determining all query conditions as well as allowing a user to specify (or request programmatic determination of) further conditions.

5 Claims, 9 Drawing Sheets

U.S. PATENT DOCUMENTS

| | | | |
|---|---|---|---|
| 2002/0054134 A1* | 5/2002 | Kelts | 345/788 |
| 2002/0065778 A1 | 5/2002 | Bouet et al. | |
| 2002/0078035 A1 | 6/2002 | Frank et al. | |
| 2002/0087408 A1* | 7/2002 | Burnett | 705/14 |
| 2002/0107842 A1* | 8/2002 | Biebesheimer et al. | 707/3 |
| 2002/0107843 A1* | 8/2002 | Biebesheimer et al. | 707/3 |
| 2002/0149614 A1* | 10/2002 | Biebesheimer et al. | 345/738 |
| 2003/0018634 A1* | 1/2003 | Shringeri et al. | 707/4 |
| 2003/0069940 A1* | 4/2003 | Kavacheri et al. | 709/217 |
| 2003/0172061 A1* | 9/2003 | Krupin et al. | 707/3 |
| 2004/0043758 A1* | 3/2004 | Sorvari et al. | 455/414.1 |
| 2004/0181448 A1 | 9/2004 | Hartsman et al. | |
| 2004/0181457 A1* | 9/2004 | Biebesheimer et al. | 705/26 |
| 2004/0205811 A1 | 10/2004 | Grandy et al. | |
| 2005/0004911 A1* | 1/2005 | Goldberg et al. | 707/7 |
| 2005/0131778 A1 | 6/2005 | Bennett et al. | |

* cited by examiner

FIG. 1

Web Page Viewer

File  Edit  View ...

Address: http://www.ibm.com/sampleJobPostings.html

Job Postings

| Date Posted | Job Title | Description | Salary | Location |
|---|---|---|---|---|
| 03 Oct 20 | Software Engineer | Java Programmer | $60,000 | US-NC-Raleigh |
| 03 Oct 10 | Nurse | Emergency Room Nurse | $55,000 | US-CA-San Diego |
| 03 Oct 1 | Librarian | Rare Book Room | $40,000 | US-IL-Urbana |
| 03 Sept 25 | Software Developer | C Programmer | $57,500 | US-FL-Orlando |
| 03 Sept 25 | Attorney | Personal Injury Associate | $70,000 | US-GA-Atlanta |

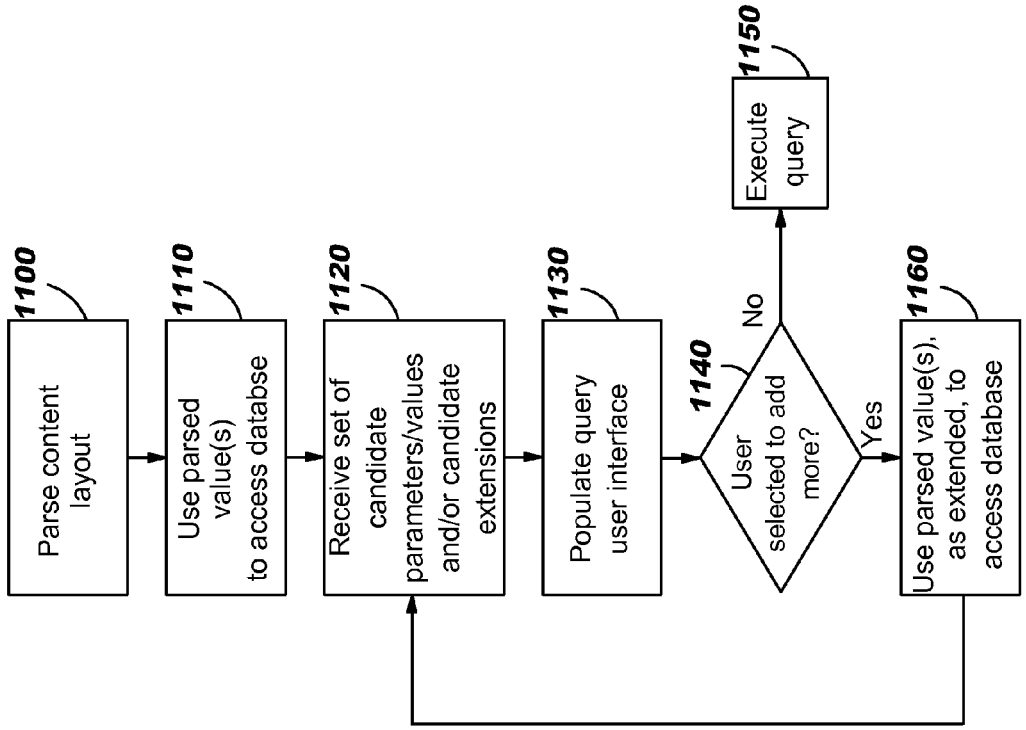
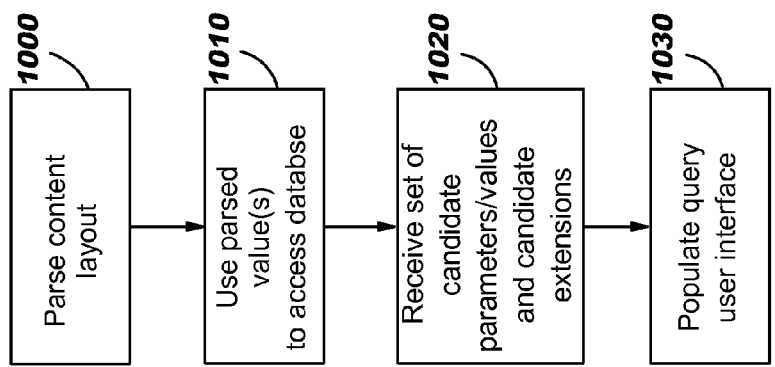

INTELLIGENT DATA QUERY BUILDER

RELATED INVENTIONS

The present application is related to the following commonly-assigned applications, which were filed concurrently herewith: U.S. patent application Ser. No. 10/733,985, titled "Customized Subscription Builder" and U.S. patent application Ser. No. 10/733,625, titled "Intelligent Subscription Builder". These co-pending applications are hereby incorporated herein by reference.

FIELD OF THE INVENTION

The present invention relates to computer software, and deals more particularly with techniques for programmatically determining one or more logical choices to be offered to users as conditions of a data query (e.g., for searching a content source), and enabling extensions to already-established queries to be programmatically created.

DESCRIPTION OF THE RELATED ART

In today's networked world, a user can be notified of events in a number of ways, including via their insnt messaging client, e-mail client, or personal digital assistant ("PDA"). Unfortunately, however, users are limited to what they can be notified about because they are restricted to predetermined data feeds which are defined by other parties such as a software vendor or Web portal. Well-known examples of such data feeds include delivery of current weather, stock prices, and news to subscribers. Currently, the provider of the content is required to deploy a subscription interface that enables users to subscribe to content. Using the subscription interface, users indicate that they would like a particular data feed delivered to a client application over a communications network.

There are several drawbacks to existing techniques. If a content provider has not provided a subscription interface, then users are unable to subscribe to the content. Instead, they have to repeatedly take explicit action to continue viewing the content, such as returning to the content provider's Web page periodically. Another drawback of existing techniques is that, even if a subscription interface has been provided, it often does not has sufficient granularity to meet the needs or desires of end users. As a result, the user effectively gets no say as to what data feed is important to him/her. Furthermore, selecting parameters for a content subscription is a manual process that may often be tedious and error-prone, leading to user frustration and/or delivery of content which is not optimized for the user's interests.

The present invention provides novel techniques for programmatically assisting users in defining query parameters, thereby establishing more effective queries and/or queries with reduced errors. The queries thus defined may be used, for example, as the conditions under which the users selectively subscribe to data feeds.

SUMMARY OF THE INVENTION

An object of the present invention is to programmatically assist users in defining query parameters.

Another object of the present invention is to provide techniques with which end users can more easily select conditions under which content is delivered.

A further object of the present invention is to define techniques for providing improved subscription interfaces.

Still another object of the present invention is to define techniques that enable users to benefit from well-defined queries, without requiring the users to build the query parameters manually.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and computer program products. In one aspect of preferred embodiments, the present invention provides techniques for programmatically building queries in a computing environment, comprising: programmatically identifying, for a content source, at least one element thereof as candidate query parameters; and providing the identified parameters for use in carrying out a query of the content source.

In another aspect, the programmatic building of queries comprises: enabling a user to identify elements of a content source as query parameters; programmatically identifying, for at least one of the query parameters, values to use as candidate values in a query of the content source; and providing the identified values and the query parameters for use in carrying out a query of the content source.

In still another aspect, the programmatic building of queries comprises: programmatically identifying, for at least one query parameter to be used when querying a content source, one or more candidate query qualifiers; and providing the identified qualifiers and the query parameters for use in carrying out a query of the content source.

In a further aspect, the programmatic building of queries comprises: obtaining a set of one or more query parameters for querying a content source; and programmatically identifying, for the obtained query parameters, one or more candidate extensions thereto which are usable for querying the content source. The set may be obtained as input from a user, or may be programmatically determined. The candidate extensions may be identified, for example, by using one or more of the obtained query parameters to consult a lookup table. A user may be allowed to select one or more of the programmatically-identified candidate extensions for querying the content source.

In these aspects, the programmatic identification may further comprise consulting a lookup table using information regarding the content source, or using information regarding a user for whom the query will be carried out. A user may be allowed to request addition of parameters for the query, in which case at least one query extension parameter is preferably identified.

The present invention will now be described with reference to the following drawings, in which like reference numbers denote the same element throughout.

BRIEF DESCRIPTION OF THE DRAWINGS

FIG. 1 provides a sample Web page illustrating content against which a user may execute a programmatically-built query, using techniques disclosed herein;

FIGS. 8 through 11 provide flowcharts illustrating logic that may be used when implementing aspects of preferred embodiments of the present invention that correspond generally to FIGS. 4 through 7, respectively.

DESCRIPTION OF PREFERRED EMBODIMENTS

The present invention provides techniques for programmatically building queries. These queries may be used for retrieving content from a Web site (or analogous network-accessible content view), for example when a user is building a subscription to the content of the Web site or some subset thereof. Accordingly, techniques disclosed herein may be used in combination with either or both of the related inventions, which are directed toward content subscriptions. The disclosed techniques can therefore be used to assist users in building subscriptions to any data on the Internet (or other network; references herein to "Internet" or "Web" are by way of illustration but not of limitation). However, the present invention is not limited to a content subscription environment, and may be used for building more general queries.

Use of the present invention enables users to benefit from powerful queries, without requiring the users to manually construct those queries. Because the user is assisted programmatically, fewer opportunities for user error will be present, thereby leading to an improved user experience. An advantage offered to businesses is that users of their content will generally have a more favorable experience. In addition, the businesses need to create roll-your-own query subsystems for use with the content they provide.

Preferred embodiments will now be described in more detail with reference to FIGS. 1-11.

The sample Web page 100 depicted in FIG. 1 illustrates content against which a user of the present invention might advantageously issue a query. As shown therein, the sample Web page 100 corresponds to a Web site on which job openings are posted. In this example, job postings include software engineer, nurse, librarian, software developer, and attorney. See the Job Title column 130. The sample Web page also includes a Date 120 on which the job opening was posted; a Description 140, providing more information about each job opening; the Salary 150 for this job opening; and the Location 160 of this job opening.

When used in combination with either of the related inventions, embodiments of the present invention enable a user to subscribe to this Web page content in a user-customized manner. The user can thereby be notified of updates to the content, and can choose to receive only the data that is of interest to this user. For example, suppose a particular user is interested in computer programming-related jobs. This user might be interested in the software engineer and software developer postings shown in FIG. 1, but would likely be uninterested in availability of jobs for nurses, librarians, and attorneys.

Hereinafter, discussions of preferred embodiments focus on techniques of the present invention in isolation. It will be obvious to one of ordinary skill in the art how these techniques may be leveraged with either or both of the related inventions.

Figure 2:
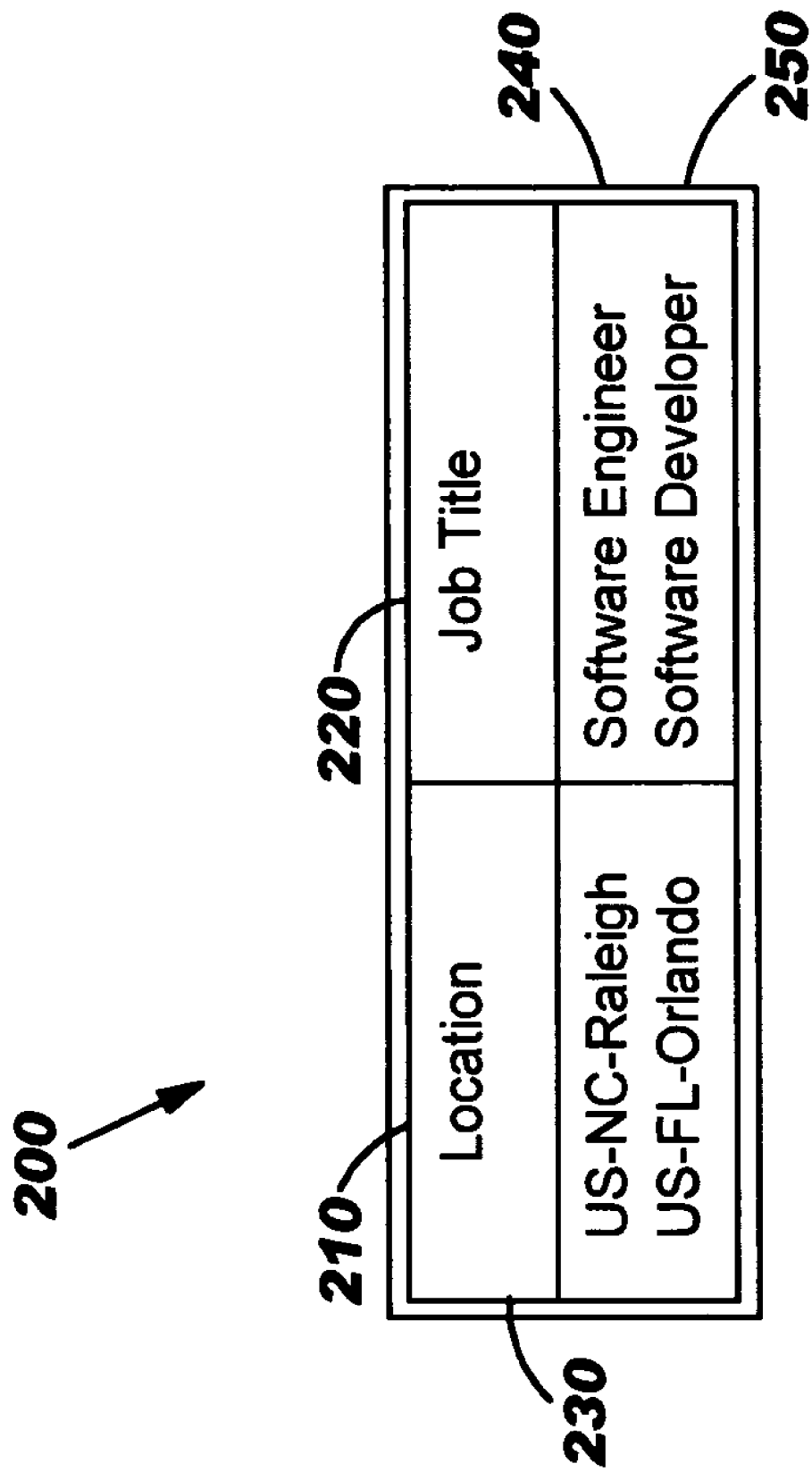
FIG. 2 illustrates a sample table containing a subset of the content in FIG. 1, which may be of interest to a particular user.

According to preferred embodiments, content of interest to a user is modeled as a table of values. This is illustrated in FIG. 2, which illustrates a sample table 200 containing a subset of the job postings content from Web page 100 in FIG. 1. In this example, the content of interest comprises only the Location column 210 and Job Title column 220, which are presented as column headings 230 of table 200, and particular values for the location and job title are restricted (in this example) to the values shown in rows 240, 250. (In other scenarios, the table reflecting content of interest might contain more, or fewer, row and/or column values as contrasted to the content source. Or, the table might reflect only column headings in still other scenarios.)

In one aspect of preferred embodiments, the columns of interest are determined programmatically (and the values may optionally be determined programmatically). In another aspect, the columns are selected by a user, and the values are determined programmatically. (See, for example, the discussion of FIGS. 4 and 8.) In yet another aspect, the columns from a table such as table 200 are used to programmatically determine other columns (i.e., other types of values) that are likely to be of interest to the user. (See, for example, the discussion of FIGS. 5 and 9.) In still another aspect, the user may select to "drill down" further with the programmatically-constructed query. (See, for example, the discussion of FIGS. 7 and 11.) That is, the user may be given an option to extend a query beyond its current parameters, where the extension is also determined programmatically.

Figure 3:
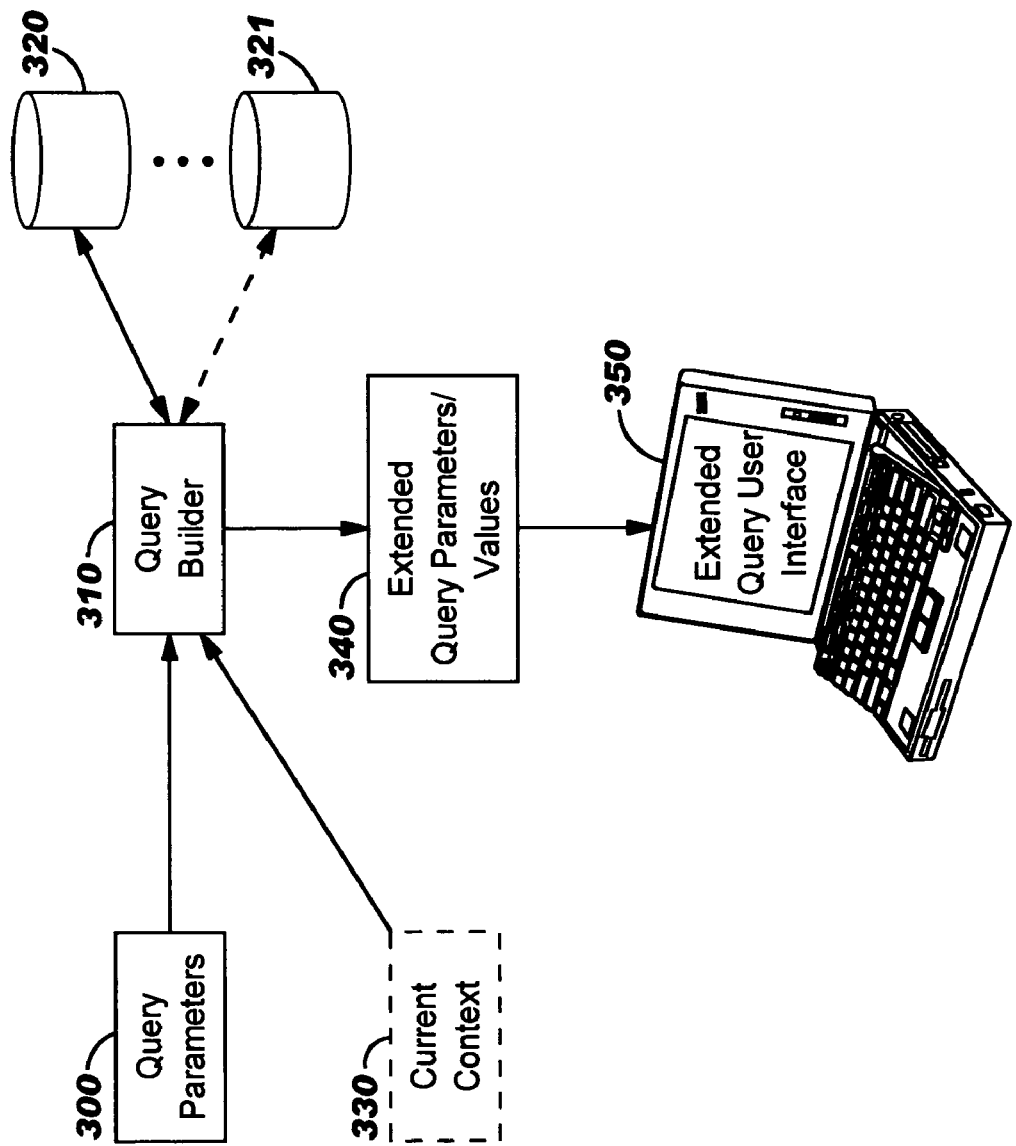
FIG. 3 illustrates, at a high level, components and flows used in preferred embodiments of the present invention.

Referring now to FIG. 3, components and flows used in preferred embodiments of the present invention are illustrated. Query parameters 300, which may be programmatically determined or selected by a user as noted above, are input to a query builder component 310. Current context information 330 may optionally comprise additional input to the query builder, and thus element 330 is depicted in FIG. 3 using a dashed rectangle.

The query builder accesses one or more databases 320, 321, ... (or, equivalently, data repositories such as directories, files, and so forth; the term "database" is used herein for ease of reference). Output from the query builder comprises extended query parameters/values 340, which are preferably rendered to a user on a user interface 350, thereby enabling the user to preview the query and optionally modify the query before its execution.

Operation of the query builder 310 will now be described in more detail with reference to the sample user interface menus in FIGS. 4-7 and the flowcharts in FIGS. 8-11.

Figure 4:
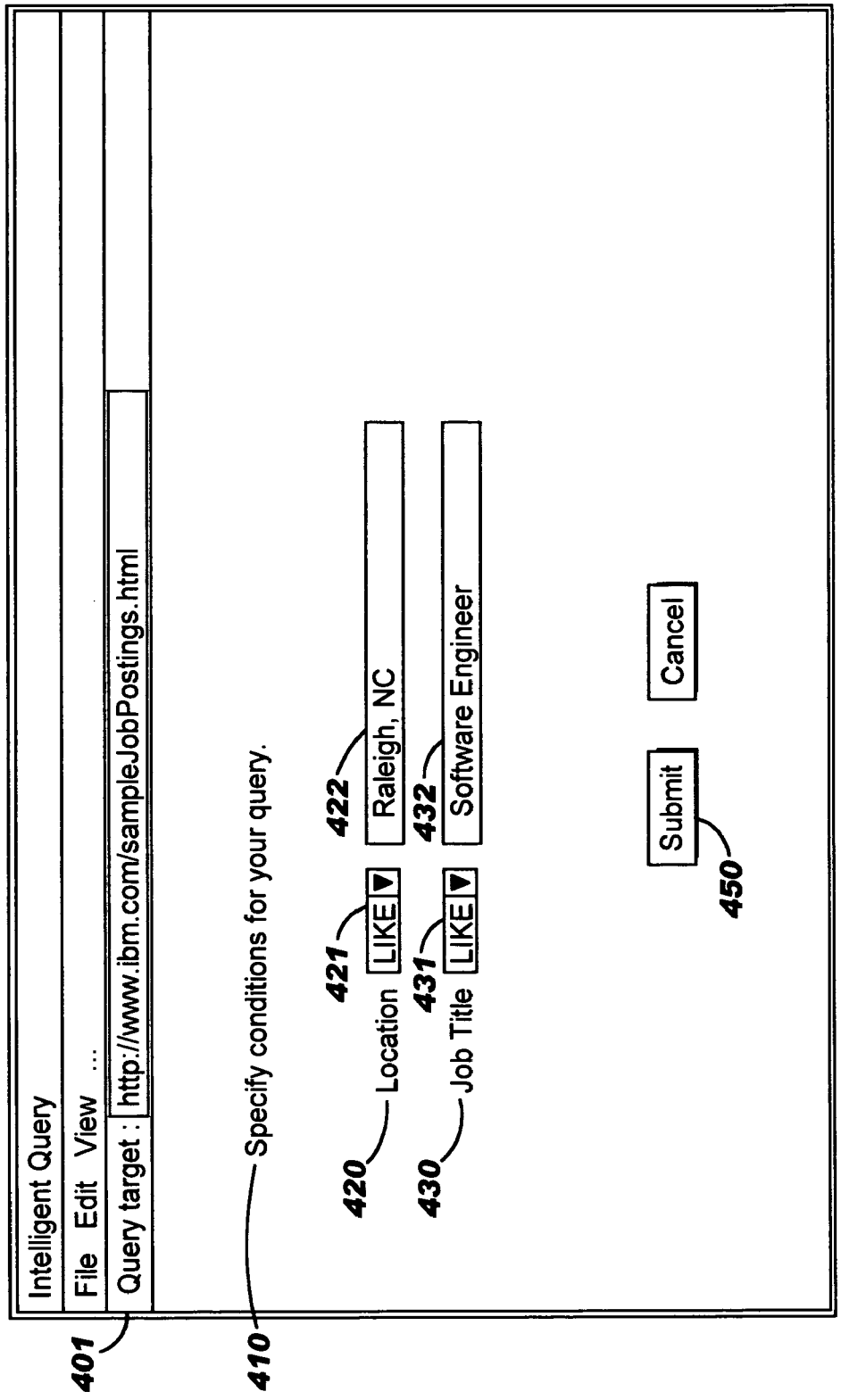
FIGS. 4 through 7 illustrate query parameter selection menus of the type that may be provided by preferred embodiments.

The menu 400 illustrated in FIG. 4 displays an optional field 401 where a target of the presented query is displayed. In this example, the value of field 401 identifies the Web page 100 of FIG. 1. A message 410 requests, in this example, that the user specify conditions for the query. Note, however, that the user does not manually build the entire query in FIG. 4 (or the queries in FIGS. 5-7): instead, embodiments of the present invention assist the user in building queries. In various aspects, as discussed above, the degree of assistance varies.

For the query shown in FIG. 4, for example, the user in one aspect is not required to take any action to select the initial query parameters. Thus, with reference to the sample Web page 100, an embodiment of this aspect of the present invention programmatically determines that users viewing this type of job posting information are typically interested in querying the content using location and job title as parameters. Thus, these parameters are automatically supplied on the rendered query user interface 400, as shown at reference numbers 420 and 430.

In another aspect, the user may explicitly select location 420 and job title 430 as the subset of job posting content for which he/she would like to execute a query. In this aspect, an embodiment of the present invention may programmatically determine what query qualifiers should be used when executing a query. For example, the query qualifiers in FIG. 4 are shown as "LIKE" at reference numbers 421, 431. Additional choices might include "EQUAL", "IN", "NOT LIKE", and so forth (as discussed below). If "Salary" (which typically has a numeric value) was included as a query parameter, its qualifier would preferably be of the form "<", "=", ">", and so forth. In addition or instead, an embodiment of the present invention may programmatically determine what values to use when populating drop-down lists (or other appropriate value entries) of query patterns. This is illustrated in FIG. 4 at reference numbers 422, 432, representing a programmatic determination that values of interest to a user are likely to include "Raleigh, N.C." as a location and "Software Engineer" as a job title.

For example, the user might select the "LIKE" choice depicted in list 421 in combination with "Raleigh, N.C." in drop-down list 422 to indicate that he/she wishes to see jobs in locations similar to Raleigh, N.C. "Similar", in this context, may be interpreted as geographically nearby. Or, a query engine that executes queries built by an embodiment of the present invention may be adapted for determining factors such as population density, and using cities of similar characteristics for those locations which are "like" Raleigh, N.C. As another example, the query engine might perform a string pattern-matching operation to determine whether one value is "like" another.

Note that embodiments of the present invention are directed toward building queries, and assisting users in building (or customizing) queries. The queries may be carried out using a query engine that is outside the scope of the present invention. For example, a database or other repository of terms, indexed by keywords such as "location", may be used with an implementation of the present invention to enable making a programmatic determination of which content values match a particular query. For example, the database might use "location" as a keyword to retrieve a set of comparison criteria that define how to determine whether one location is similar to another. As another example, "job title" might be used as a keyword that will retrieve a set of criteria indicating how to tell if one job title is similar to another. In this latter case, sets of job titles that are to be considered as matching, such as "Software Engineer" and "Software Developer", might be specified.

Drop-down list 421 may contain other entries such as "EQUAL", as stated above, indicating that the user wants an exact match on values of the job location, or "IN", indicating that the user has specified some string (such as a state code) that must be found in the location before a job posting is of interest to this user.

Optionally, if the values from which a query is programmatically built include user-selected values from the source content, such as individual cell values from Web page 100, an implementation of the present invention may automatically provide those values in the drop-down list, along with other programmatically-determined values for the appropriate column heading. So, for example, if the user had clicked on the job posting for "Nurse" when viewing Web page 100, the drop-down list 432 might automatically include "Nurse Practitioner", "Licensed Practical Nurse", "Registered Nurse", etc., in addition to showing "Nurse" as a choice when this option is implemented.

Figure 8:
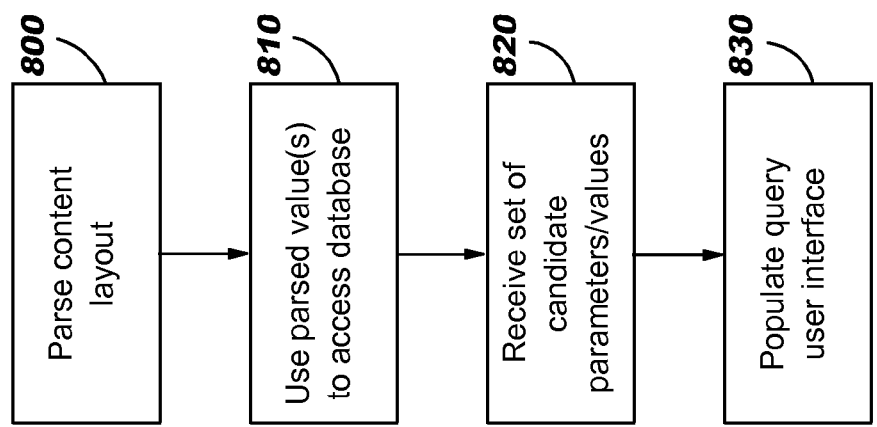

Referring now to FIG. 8, a flowchart is depicted showing logic that may be used for an implementation presenting a query user interface of the type illustrated in FIG. 4. This logic indicates that a content layout is parsed (Block 800), and one or more of the parsed values are then used to access a database (Block 810). (As will be obvious, it may happen that the content layout has already been parsed, in which case the processing of Block 800 or its counterparts in FIGS. 9-11 comprises obtaining the parsed values.) A set of candidate parameters are returned (Block 820), and used to populate the query interface (Block 830). The manner in which these operations may be carried out in several aspects will now be described in more detail.

In an aspect where the user has not made selections manually when the query-building process begins, Block 800 may comprise parsing the entire underlying content source. For example, when the content source is a Web page, the underlying content is typically specified in Hypertext Markup Language ("HTML") syntax. The parsing may therefore comprise identifying the tag names from elements of the content source. So, with reference to FIG. 1, by way of example, the column headings 120-160 might result from this parsing process. Block 810, in this aspect, preferably comprises consulting a database to determine whether some subset of those column headings are likely to be of more interest to users than others (and the column headings, or a pointer thereto, are preferably passed to the database at Block 810). For example, while a user might be interested in searching on job title, the database might indicate that the "Description" column 140 should be omitted. (The description values might be perceived, for example, as being too "free form" to be useful when executing a query.) The consulted database may contain information that based on gathered statistics, or it may contain mappings among terms, by way of illustration. As an example of the latter scenario, a mapping might be built as a set of terms, such as {"Location", "Job Title", "Education Requirements", "Salary"}, indicating that these four parameters represent the interests of a "typical" user. The values returned from the database access of Block 810 might then be structured such that any additional column headings (i.e., "Date Posted" and "Description", in this example) have been pruned from the set that was passed to the database for evaluation.

In another aspect, the parsed layout passed in Block 810 may comprise a set of values which have been selected by the user. For example, the user might have selected (with a pointing device or other selection mechanism) the Location column 160 and Job Title column 130 from Web page 100 in FIG. 1. In this aspect, the database access may comprise retrieving candidate values to be presented in drop-down lists 422, 432, and/or candidate qualifiers to be presented in drop-down lists 421, 431. Furthermore, this programmatic selection of candidate values, and/or a programmatic selection of candidate qualifiers, may be used with the programmatic selection of query parameters just described (i.e., where the user did not select any columns).

In one approach to programmatically selecting candidate values, a current context may be supplied to the query builder, as discussed above with reference to element 330 of FIG. 3. This current context may comprise an identification of the user, the user's device, the user's preferences, the user's role, the current time of day, and/or a number of different types of information, as deemed useful for an implementation of the present invention. The manner in which context information of this type can be retrieved is well known in the art. For example, if the current user's role is "Systems Administrator", this may be used as an index at the database to determine what values for "Job Title" are likely to be of interest for this user, and those values may then be used to populate the drop-down list 432. Or, if the user's current context indicates that he/she is physically located in the United States, then this information may be used to populate the drop-down list 422 with only job location in the United States. Many other examples of using context information will be obvious, once the teachings disclosed herein are known.

As noted above, the user may be allowed to customize the query patterns. For example, while the example in FIG. 4 shows values that are supplied in drop-down lists 422, 432, aspects of the present invention may present these drop-down lists as empty text entry fields, allowing the user to supply values therein. In this case, the present invention advantageously supplies the query parameters. (such as parameters 420, 430) and/or the query qualifiers (illustrated at 421, 431). Or, when the values in the drop-down lists are programmatically supplied, an embodiment of the present invention may allow the user to manually extend the choices therein. Preferably, the user is allowed to select multiple query values (i.e., values of drop-down lists illustrated by elements 422, 432) for a particular query. Techniques for selecting multiple entries in lists of this type are well known in the art.

In another approach to customization, the user may be allowed to delete one or more of the programmatically-provided choices. If the user removes all values from a selected query parameter, then that query parameter is preferably completely removed from the query pattern; or, a wildcard might be programmatically substituted for the query value. By deleting all values from the drop-down list associated with Location, for example, the user thereby indicates his/her desire to execute a query that evaluates only content in the Job Title field when this approach to customization is implemented. (If the user removes all values from all drop-down query value lists, this is preferably treated as an error condition requiring correction by the user.)

Once the user has previewed the query patterns, and customized the pattern when customization is supported, he/she preferably activates a "Submit" button 450 or similar mechanism for accepting the previewed query. This query may then be executed, and/or it may be stored for subsequent execution.

Figure 5:
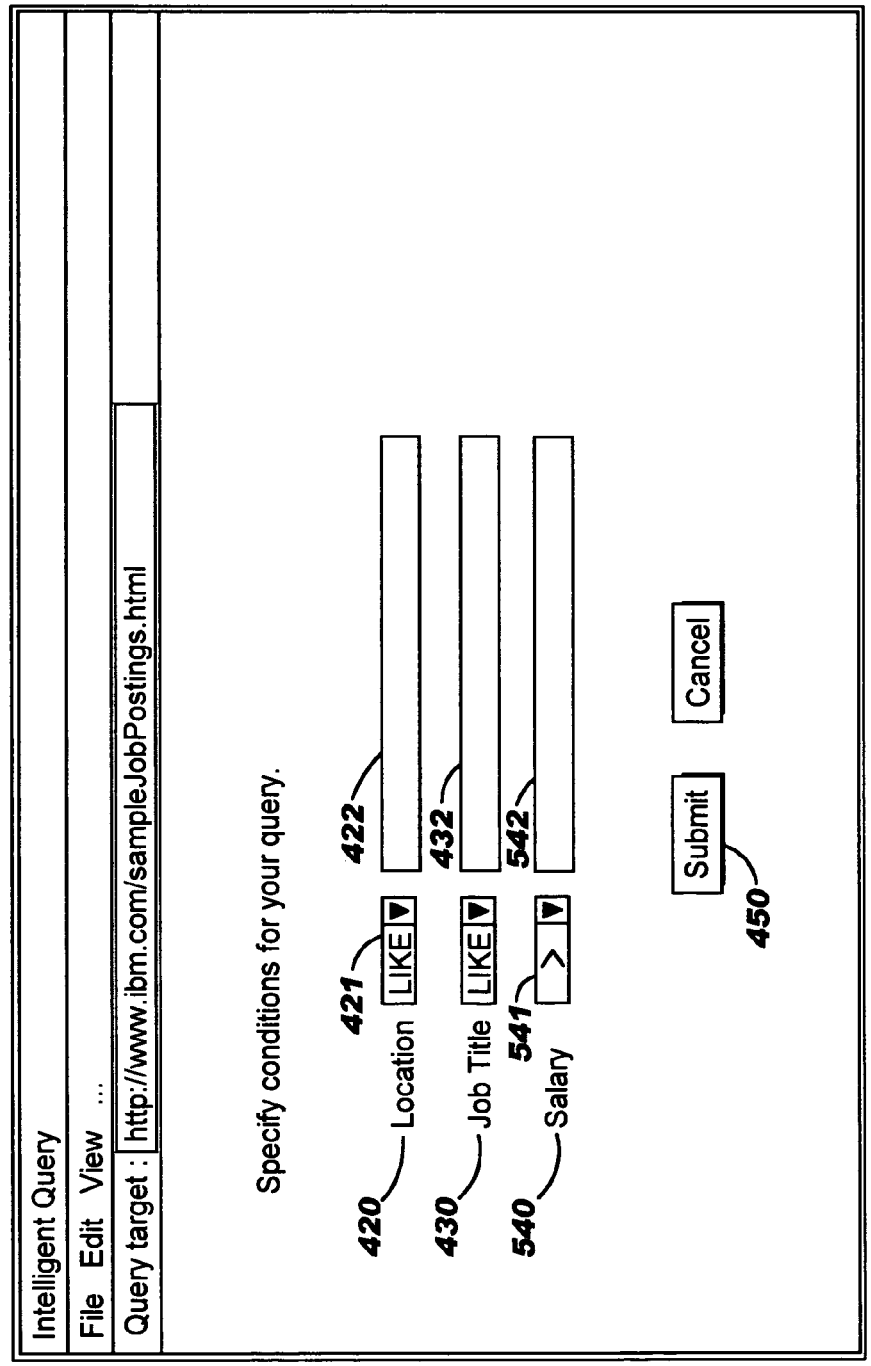
Figure 9:
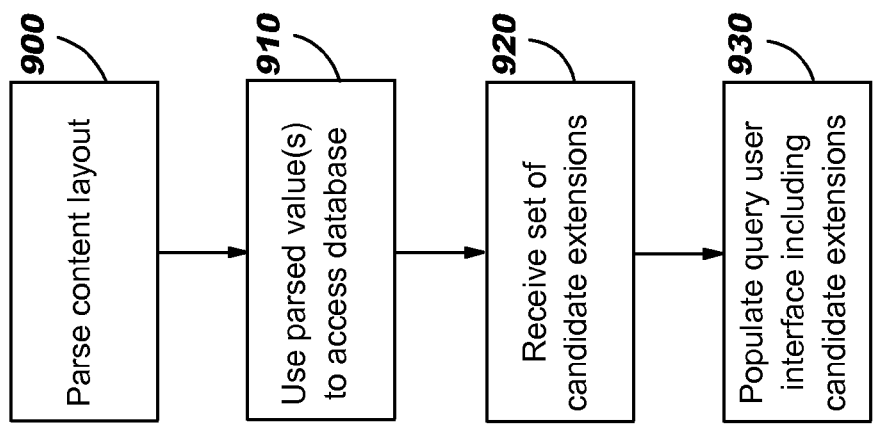

The sample user interface 500 in FIG. 5 illustrates another aspect of preferred embodiments, whereby existing query parameters are programmatically extended. FIG. 9 depicts logic that may be used when implementing this aspect.

In this aspect, the existing query parameters may have been determined programmatically (e.g., by selecting all column headings underlying a rendered Web page, as discussed above with reference to the job postings on Web page 100), or they may have been selected explicitly by a user. In this aspect, the query builder parses the existing query parameters (Block 900), and uses those parameters to access one or more databases (Block 910). The database access yields a set of one or more extensions, which are received at Block 920 and used to populate the query interface at Block 930.

Suppose, for purposes of illustration, that the existing query parameters comprise the column headings 210, 220 shown in FIG. 2. Block 900 preferably comprises extracting the values of those column headings, which are then passed to a database and used as index values into a stored mapping (or a plurality of mappings). The set of terms {"Location", "Job Title", "Education Requirements", "Salary"} was discussed earlier as a potential set of related terms that are of interest to a typical user. In this aspect, when two of those four terms are passed to the database, the remaining terms are retrieved and are returned to the query builder, thereby providing query "extensions". In another approach, each term passed to the database may be used to retrieve a set of associated terms, and the union thereof may be used as the extensions in this aspect. So, for example, this aspect enables a user who may have selected location and job title as query parameters to further quality his/her query to prune job postings according to their education requirements and their salary, without requiring the user to select those parameters manually.

It should be noted that references herein to accessing a "database" are by way of illustration. More generally, a "lookup component" may be used which is not necessarily deployed using a database system. Furthermore, more than one distinct source, such as more than one database or more than one lookup component, may operate in cooperation with one another to return the candidate values discussed herein.

Referring again to FIG. 5, in this example, the extension returned at Block 920 comprises the "Salary" parameter which is automatically displayed for the user at 540. Preferably, a drop-down query qualifier list 541 is also rendered for each query parameter extension, along with a drop-down query value list 542.

Note that values are not depicted in lists 422, 432, 542 in this example. This illustrates that this aspect may be directed toward extending only the existing query parameters (illustrated at reference numbers 420, 430), if desired for a particular implementation. Another approach is shown in FIG. 6, as will now be described.

Figure 6:
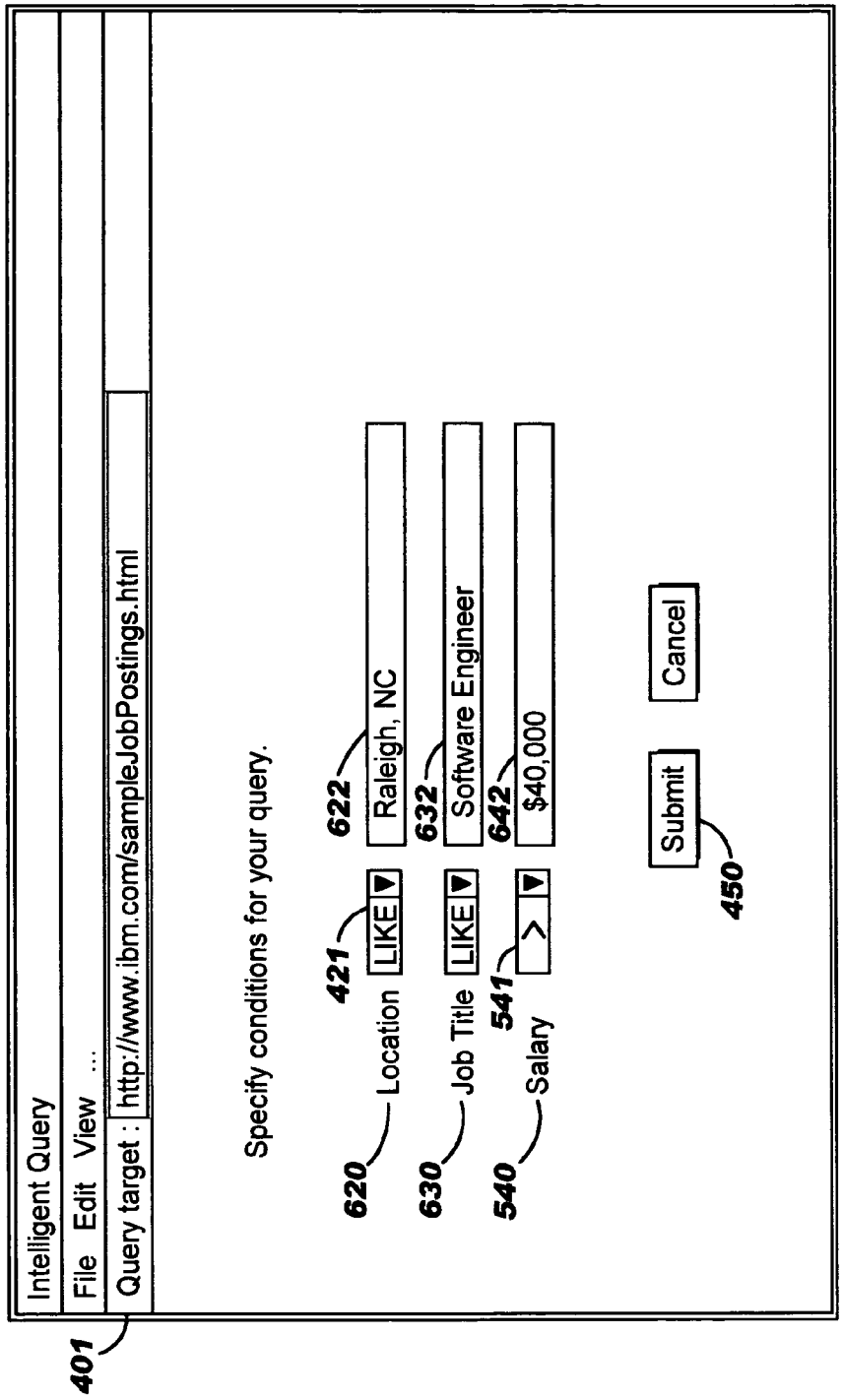

The sample interface 600 in FIG. 6 illustrates an aspect where programmatic query extensions of the type discussed with reference to FIGS. 5 and 9 may be combined with programmatically-supplied values and/or programmatically-supplied parameters (i.e., where the user did not select the initial query parameters) of the type discussed for FIGS. 4 and 8. FIG. 10 provides a flowchart depicting logic that may be used when implementing the aspect illustrated in FIG. 6.

As shown at Blocks 1000 and 1010 in FIG. 10, the parsed content is used to access a database, as has been discussed above with reference to FIGS. 8 and 9. Now, however, the database retrieval comprises determining additional query parameters (e.g., Salary 540), as discussed with reference to FIGS. 5 and 9, as well as candidate values to use for the original parameters and/or the extended parameters, and receiving those at Block 1020. The user interface 600 therefore displays drop-down lists 622, 632, 642 as being "primed" with candidate values, and either or both of the location 620 and job title 630 parameters may have been programmatically determined as discussed with reference to FIGS. 4 and 8.

Figure 7:
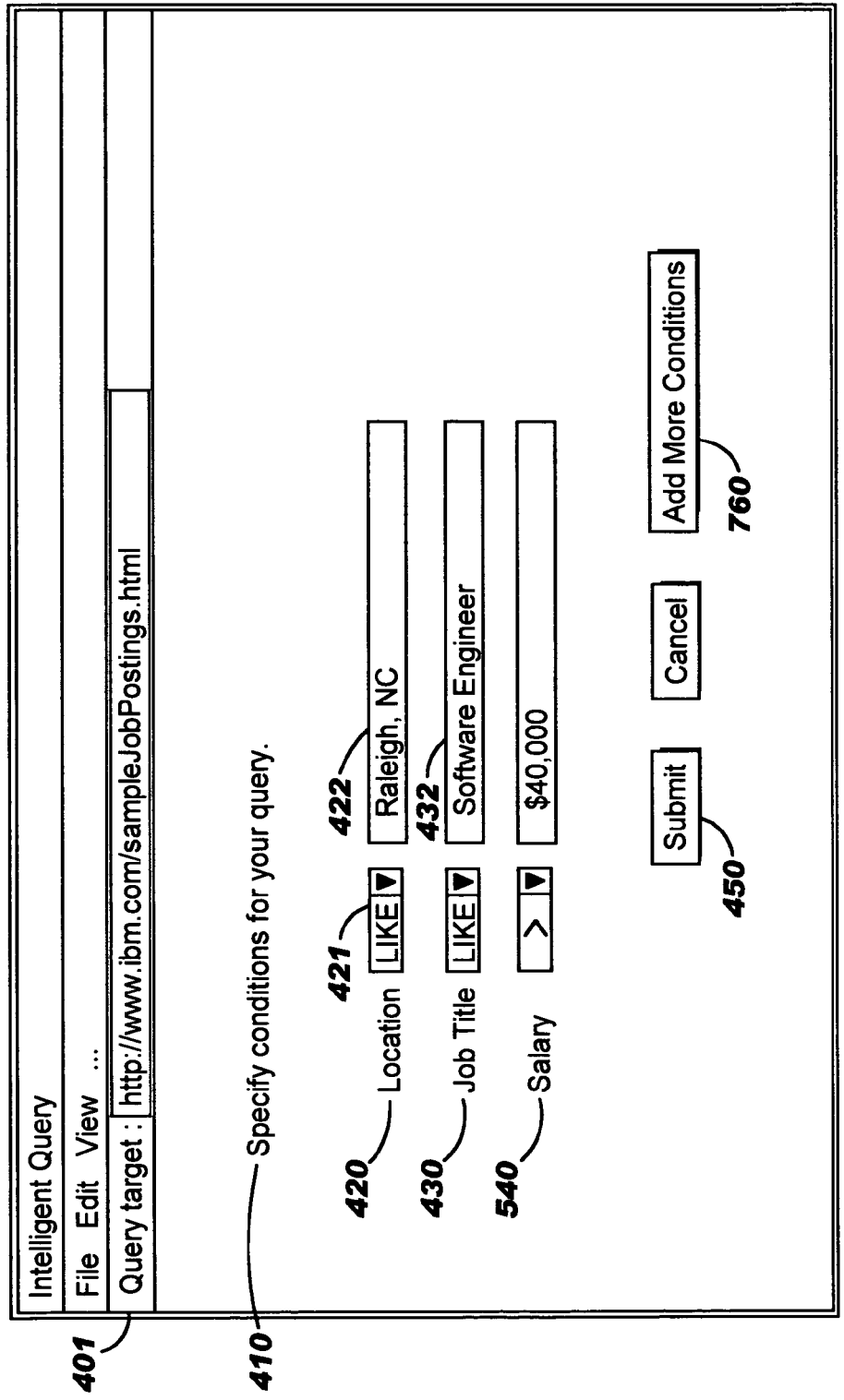

Still another sample interface 700 is shown in FIG. 7, illustrating an aspect where users may explicitly request extending the query pattern to further levels of detail. FIG. 11 depicts logic which may be used when implementing this aspect. The functionality of Blocks 1100 and 1110 is preferably as described for Blocks 1000 and 1010 and earlier counterparts in FIGS. 8 and 9, and the functionality of Block 1120 may be as described in Block 820, 920, or 1020.

Upon receiving the candidate information in Block 1120, the user interface is populated at Block 1130. Block 1140 then checks to see if the user has requested to add more conditions to this query. Referring to FIG. 7, a graphical button 760 or other selection mechanism is preferably provided for this purpose. Suppose, for example, that the initial values passed to the database in Block 1110 are Location and Job Title, and that the database contains the 4-member set of terms {"Location", "Job Title", "Education Requirements", "Salary"} that was discussed earlier. Embodiments of the present invention may optionally employ additional filtering, for example by concluding that users having the same role as the current user are not typically interested in the education requirements listed in job postings. Thus, the only query extension returned in this scenario might be Salary, as shown at 540 in FIG. 7. This particular user, however, may wish to see if there are ways to further constrain the query, and may therefore select button 760.

When button 760 is pressed (or the user otherwise selects to add more conditions), the test in Block 1140 has a positive result and processing continues at Block 1160. Preferably, this processing comprises using the current parsed value(s), as extended, as input to a new database access. FIG. 11 therefore shows that control transfers from Block 1160 to Block 1120, where results of the new database access are received. This new database access might locate and return the "Education Requirements" query parameter, for example. Or, one or more other lookups might be performed, where this iteration of Block 1120 represents returning the results thereof For example, the salary parameter which was returned as a programmatic extension in the previous iteration of Block 1120 might be used as an index term, and might generate "Employee Benefits" as a new query parameter.

Block 1130 then populates the user interface with this most recent set of information, and control again reaches the test in Block 1140. If the user does not choose to add more conditions, then the test in Block 1140 has a negative result, and the query may be executed (as shown in Block 1150) and/or saved for subsequent use.

As will be obvious, a user may be interested in querying many different kinds of content, and the conditions which are useful in those queries may vary widely. Accordingly, as will be obvious, the examples which have been discussed are by way of illustration and not of limitation.

As has been described, embodiments of the present invention provide a number of advantages to end users and to companies. An implementation of the present invention may be offered as a stand-alone product or as a service, or it may be coupled or integrated with another software product, including (but not limited to) an embodiment of either of the related inventions.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-readable program code embodied therein. In addition, the present invention may be offered as a method of doing business (for example, whereby queries are created for users, perhaps for a fee, and so forth).

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of programmatically building a query user interface to build a query command to query content of a Web page, wherein the Web page lacks a query user interface, comprising:

programmatically determining a current context of a user of a device on which the Web page is rendered, the current context comprising at least one of: an identification of the user; a role of the user; the device used by the user; and a geographical location of the user;

programmatically determining a plurality of content values specified in the Web page;

programmatically determining, based on the specified content values, a plurality of content types corresponding thereto;

using the programmatically-determined current context and at least one of the programmatically-determined content types to consult a lookup component which obtains at least two query parameter names to display on the programmatically-built query user interface;

programmatically identifying, for each of the obtained query parameter names, at least one selectable query qualifier corresponding thereto, wherein each of the selectable query qualifiers indicates a particular comparison to be performed when subsequently comparing selected ones of the content values to that query parameter name;

programmatically identifying, for each of the obtained query parameter names, at least one selectable parameter value corresponding thereto;

programmatically building a plurality of query parameters by associating, with each of the obtained query parameter names, each of the at least one programmatically-identified selectable query qualifiers corresponding thereto and each of the at least one programmatically-identified selectable parameter values corresponding thereto;

displaying on the query user interface, for each of the programmatically-built query parameters, the obtained query parameter name, a first selector for selecting one of the at least one query qualifiers associated therewith and a second selector for selecting at least one of the at least one parameter values associated therewith; and accepting input from the user to build the query command to query the Web page, further comprising:

accepting, from the user for each of the displayed query parameter names, one of the associated query qualifiers selected by the user with the first selector and at least one of the associated parameter values selected by the user with the second selector; and programmatically building the query command to specify, for each of the displayed query parameter names, the selected query qualifier and each of the at least one selected parameter values.

2. The method according to claim 1, further comprising:
programmatically identifying at least one query extension parameter for the query command, responsive to a request from the user, further comprising:
using the programmatically-determined current context and at least one of the obtained query parameter names to consult a mapping, thereby obtaining a related query parameter name;
programmatically identifying at least one selectable query qualifier corresponding to the obtained related query parameter name, wherein each of the selectable query qualifiers indicates a particular comparison to be performed if subsequently comparing selected ones of the content values to the obtained related query parameter name;
programmatically identifying at least one selectable parameter value corresponding to the obtained related query parameter name; and
programmatically building the query extension parameter by associating, with the obtained related query parameter name, the programmatically-identified at least one selectable query qualifier corresponding thereto and each of the at least one programmatically-identified selectable parameter values corresponding thereto; and
wherein the displaying further comprises also displaying the programmatically-built query extension parameter for each of the at least one programmatically-identified query extension parameters as additional ones of the programmatically-built query parameters.

3. The method according to claim 1, further comprising:
programmatically determining preferences of the user; and
wherein the using the programmatically-determined current context and at least one of the programmatically-determined content types further comprises using the programmatically-determined preferences of the user to consult the lookup component.

4. A computer-implemented system configured to programmatically build a query user interface to build a query command to query content of a Web page, wherein the Web page lacks a query user interface, comprising:
a computer comprising a processor; and
instructions which execute using the processor to implement functions comprising:
programmatically determining a current context of a user of a device on which the Web page is rendered, the current context comprising at least one of: an identification of the user; a role of the user; the device used by the user; and a geographical location of the user;
programmatically determining a plurality of content values specified in the Web page;
programmatically determining, based on the specified content values, a plurality of content types corresponding thereto;
using the programmatically-determined current context and at least one of the programmatically-determined content types to consult a lookup component which obtains at least two query parameter names to display on the programmatically-built query user interface;
programmatically identifying, for each of the obtained query parameter names, at least one selectable query qualifier corresponding thereto, wherein each of the selectable query qualifiers indicates a particular comparison to be performed when subsequently comparing selected ones of the content values to that query parameter name;
programmatically identifying, for each of the obtained query parameter names, at least one selectable parameter value corresponding thereto;
programmatically building a plurality of query parameters by associating, with each of the obtained query parameter names, each of the at least one programmatically-identified selectable query qualifiers corresponding thereto and each of the at least one programmatically-identified selectable parameter values corresponding thereto;
displaying on the query user interface, for each of the programmatically-built query parameters, the obtained query parameter name, a first selector for selecting one of the at least one query qualifiers associated therewith and a second selector for selecting at least one of the at least one parameter values associated therewith; and
accepting input from the user to build the query command to query the Web page, further comprising:
accepting, from the user for each of the displayed query parameter names, one of the associated query qualifiers selected by the user with the first selector and at least one of the associated parameter values selected by the user with the second selector; and
programmatically building the query command to specify, for each of the displayed query parameter names, the selected query qualifier and each of the at least one selected parameter values.

5. A computer program product configured to programmatically build a query user interface to build a query command to query content of a Web page, wherein the Web page lacks a query user interface, the computer program product embodied on one or more computer-readable storage media and comprising computer-readable program code for:
programmatically determining a current context of a user of a device on which the Web page is rendered, the current context comprising at least one of: an identification of the user; a role of the user; the device used by the user; and a geographical location of the user;
programmatically determining a plurality of content values specified in the Web page;
programmatically determining, based on the specified content values, a plurality of content types corresponding thereto;
using the programmatically-determined current context and at least one of the programmatically-determined content types to consult a lookup component which obtains at least two query parameter names to display on the programmatically-built query user interface;
programmatically identifying, for each of the obtained query parameter names, at least one selectable query qualifier corresponding thereto, wherein each of the selectable query qualifiers indicates a particular comparison to be performed when subsequently comparing selected ones of the content values to that query parameter name;
programmatically identifying, for each of the obtained query parameter names, at least one selectable parameter value corresponding thereto;
programmatically building a plurality of query parameters by associating, with each of the obtained query parameter names, each of the at least one programmatically-identified selectable query qualifiers corresponding thereto and each of the at least one programmatically-identified selectable parameter values corresponding thereto;

displaying on the query user interface, for each of the programmatically-built query parameters, the obtained query parameter name, a first selector for selecting one of the at least one query qualifiers associated therewith and a second selector for selecting at least one of the at least one parameter values associated therewith; and accepting input from the user to build the query command to query the Web page, further comprising:

accepting, from the user for each of the displayed query parameter names, one of the associated query qualifiers selected by the user with the first selector and at least one of the associated parameter values selected by the user with the second selector; and programmatically building the query command to specify, for each of the displayed query parameter names, the selected query qualifier and each of the at least one selected parameter values.

* * * * *